INVENTOR.
BENTLY L. ADAMSON
BY
ATTORNEY

March 25, 1958  B. L. ADAMSON  2,827,938
VEGETABLE SLICING MACHINE
Filed Sept. 20, 1956  2 Sheets-Sheet 2

INVENTOR.
BENTLY L. ADAMSON
BY
ATTORNEY

United States Patent Office 2,827,938
Patented Mar. 25, 1958

2,827,938

VEGETABLE SLICING MACHINE

Bently L. Adamson, Denver, Colo.

Application September 20, 1956, Serial No. 611,044

9 Claims. (Cl. 146—78)

This invention relates to vegetable slicing machines and, more particularly, to waffle potato chip machines.

Attempts have been made for many years to produce a machine which would slice a potato into the form of so-called "waffle chips" that are later fried and sold in place of the ordinary potato chips. A number of these machines have, in fact, been produced; however, most of them are objectionable because they waste too much of the potato and they operate too slowly to give the production necessary for economical commercial operation. Also, the overlapping and counter-rotating blades employed in most of the prior art machines to produce the waffle-like appearing slices require careful design and adjustment if they are to function properly. These blades cause some waste and the whole machine is difficult to maintain in proper working order due to the precise and delicate positioning of the blades relative to one another and to the potato being sliced.

Other vegetable slicing machines are known that employ a drum provided with one or more scoring blades that score the surface of the vegetable in two different directions and then cut off the scored portion. In these machines, however, three operations are performed on the vegetable as it is first scored in one direction, then scored in a different direction and, finally, the scored or diced portion is cut off. The instant machine, on the other hand, places a ripple surface on the vegetable and cuts the slice off in a single uninterrupted operation.

Although certain of the prior art vegetable scoring and slicing machines utilize the principle of a drum mounted for both reciprocatory and rotational movement to score the surface of the vegetable in two different directions, the slicing operation is carried out while the drum is merely rotating and not reciprocating. This, of course, requires that the drum cease reciprocation during a portion of each revolution which complicates the drive mechanism and places severe limitation on the speed of operation.

It is, therefore, one of the principal objects of the present invention to provide a vegetable slicing machine that will produce waffle chips in a single operation.

A second object of the invention is to produce a slicing machine that reciprocates continuously as it rotates.

Further objects of the invention are to provide an improved waffle potato chip slicing machine that is fast, trouble-free and which contains a simple and inexpensive drive arrangement.

An additional object of the invention is to produce a waffle chip machine that eliminates substantially all waste.

Other objects will be in part apparent and in part pointed out specifically hereinafter in connection with the description of the drawing that follows, and in which.

Figures 1, 2:
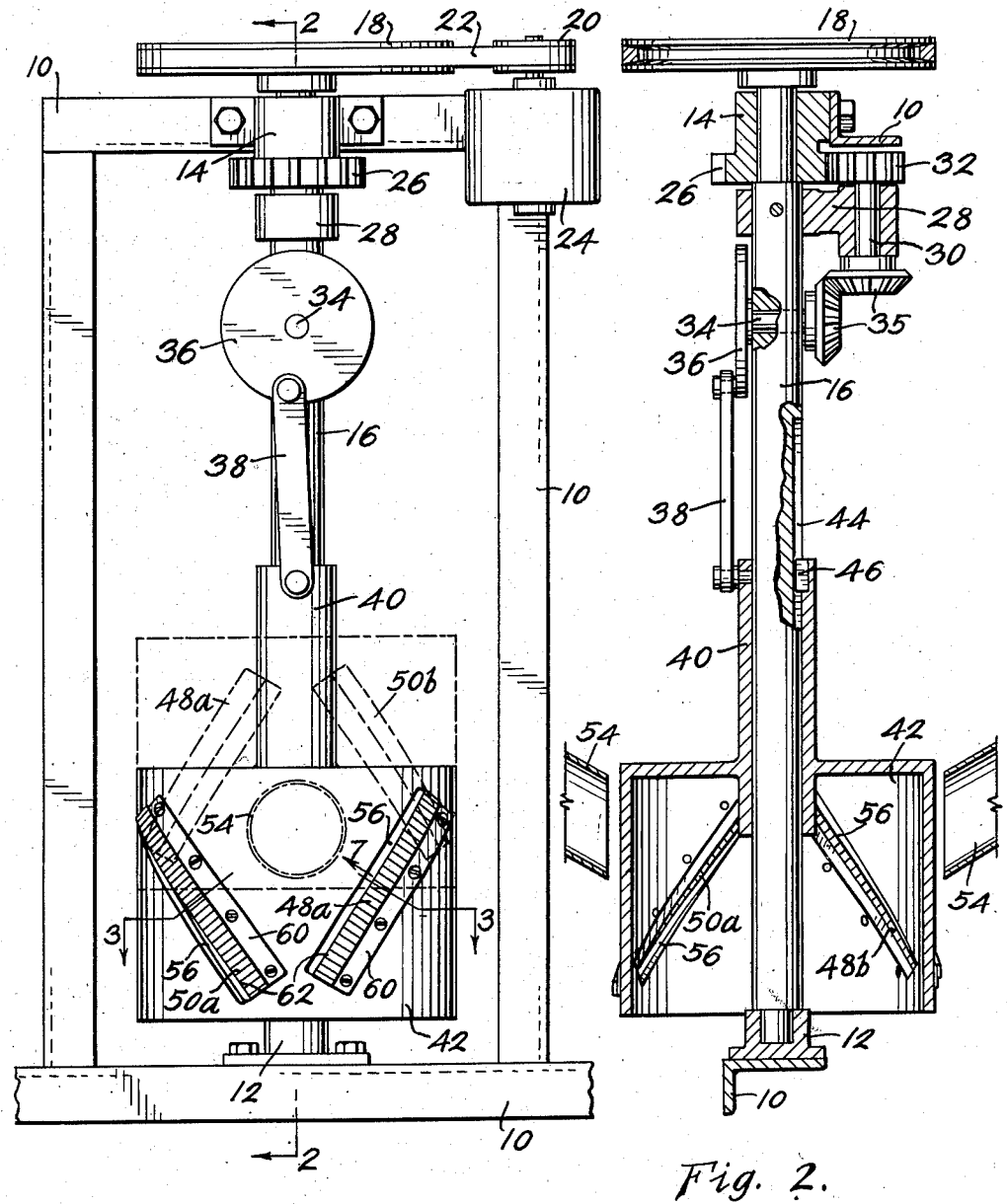
Figure 1 is a front elevation of the waffle potato chip machine of the present invention.
Figure 2 is a section taken along line 2—2 of Figure 1, portions thereof having been broken away to better show the construction.

Referring now in particular to Figures 1 and 2 of the drawing, reference numeral 10 represents a supporting frame carrying bearings 12 and 14 in which drive shaft 16 is journaled for rotation. A pulley 18 is mounted on the end of the drive shaft and connected to motor pulley 20 by belt 22. The drive shaft 16 is driven by motor 24 acting through the pulleys and belt.

Stationary gear 26 is mounted co-axially with the drive shaft although the gear does not turn as the shaft rotates therein. Arm 28 is attached to the drive shaft for conjoint rotational movement beneath the stationary gear. Stub shaft 30 is mounted in the outer end of arm 28 for rotational movement with its axis in spaced parallel relation to that of drive shaft 16. Spur gear 32 is carried on the stub shaft and meshes with stationary gear 26.

A second stub shaft 34 is mounted for rotation within the drive shaft with its axis intersecting that of the drive shaft. Meshing mitre or bevel gears 35 are mounted on the adjacent ends of the stub shafts 30 and 34. Disk 36 is mounted on the other end of stub shaft 34.

Connecting rod 38 interconnects the periphery of disk 36 and the tubular hub 40 of drum 42 which encircles the drive shaft and reciprocates thereon. The drive shaft contains a longitudinal keyway 44 in which key 46 attached to the inner surface of tubular hub 40 slides and reciprocates.

The outer surface of the drum is provided with two sets of cutters, the first set of which contains two parallel blades 48a and 48b facing upwardly at approximately a 45° angle and spaced angularly 180° apart; and, the second set which also contains two parallel blades 50a and 50b facing downwardly at approximately a 45° angle and positioned between the blades of the first pair. Two identical feed chutes 54 are provided on opposite sides of the drum in position to feed a potato or other vegetable against the outer surface of the drum into the path of the cutters as the drum rotates and reciprocates. Openings 56 are provided in the drum head of the cutters to receive the vegetable slices as they are severed.

In the particular construction illustrated, the sets of cutters each contain two blades; however, each set may contain only one blade or any number of blades greater than one as long as both sets have the same number. Although only one feed chute is necessary irrespective of the number of blades in each set of cutters, it is preferable to have the same number of feed chutes as blades in each set of cutters. For example, two chutes are shown used with cutter sets employing two blades each and three chutes could be used with three-blade cutter sets or only one chute with a one-blade cutter set.

An examination of Figure 2 will show that a potato or other vegetable in one of the feed chutes will be cut four times (once by each blade in both sets of cutters) during each complete revolution of the drum which rotates conjointly with the drive shaft due to key 46 riding within keyway 44. As the blades pass over and through the vegetable they, of course, each cut off a slice which produces four slices for each complete revolution of the drum.

As has already been mentioned, the drum 42 reciprocates continuously while it revolves. In the four-blade construction shown, a 2:1 gear ratio exists between stationary gear 26 and spur gear 32. Mitre gears 35 are the same size and, therefore, disk 36 makes one complete revolution for each revolution of spur gear 32. Each complete revolution of disk 36 moves drum 42 through one complete cycle of reciprocation upward and downward on the drive shaft or from the full line position of Figure 1 to the dotted line position and back to the full line position. Due to the 2:1 ratio between stationary gear 26 and spur gear 32, the spur gear turns one complete revolution for each half revolution of the drum and shaft or two revolutions to each full revolution of the drum. Thus, a point on the surface of the drum will move upwardly and forwardly for a quarter revolution, downwardly and forwardly during the next quarter revolution, then upwardly and forwardly again, and finally downwardly and forwardly to the starting point. A point on the drum's surface would actually describe an oscillating wave pattern as the drum both rotates and reciprocates.

Figure 6:
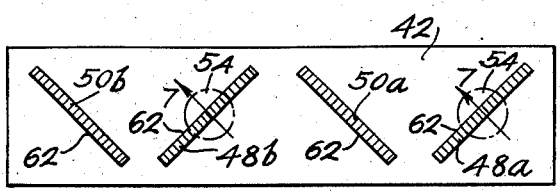
Figure 6 is a development of the cylindrical surface of the drum showing the position and direction of movement of the four blades as two of them pass over the end of the feed chutes.

Now, in connection with Figures 1 and 6, it will be seen that a portion of the drum lies opposite the feed chutes in both the full line and dotted line terminal positions of the drum that are achieved during the continuous cyclic reciprocatory movement thereof. Blade 48a is attached to the drum in position whereby its direction of movement represented by arrow 7 is substantially at right angles to the cutting edge thereof as it passes over the inner end of the feed chute 54. Of course, blade 48b will be moving in exactly the same direction with respect to both feed chutes due to the double reciprocation cycle that takes place for each full revolution of the drum. Blade 50b (Figures 2 and 6) which follows blade 48a across the feed chute is likewise arranged so that its cutting edge is at substantially right angles to its direction of movement as it crosses the chute; however, blade 50b moves downwardly and forwardly instead of upwardly and forwardly like blade 48a. In Figures 1 and 6 blade 48a is shown in position to move upwardly and forwardly across the chute as the drum reciprocates upwardly. At the same time, blade 48b on the opposite side of the drum (shown only in Figures 3 and 6) is making a like pass across the open inner end of the other feed chute. Blades 50a and 50b are inoperative during the upward reciprocatory stroke of the drum.

The dotted line position of Figure 1 illustrates the position of the drum and blades after a quarter revolution. At this point blade 50b has moved into operative position relative to the chute. On the return stroke of the drum, blade 50b will move across the chute and blade 50a on the back of the drum will do likewise relative to the other chute while blades 48a and 48b are inoperative. Blades 48b and 50a, of course, are placed in the same positions relative to the chutes as has been described in connection with blades 48a and 50b, respectively, and which has been illustrated diagrammatically in Figure 6. The four blades are angularly spaced 90° apart. In a two-blade machine that would reciprocate only one complete cycle per revolution of drum past a single chute would have the blades 180° apart; whereas, a six-blade machine reciprocating three cycles past three chutes would have each blade spaced only 60° apart. The chutes also are equiangularly spaced from one another.

Figure 3:
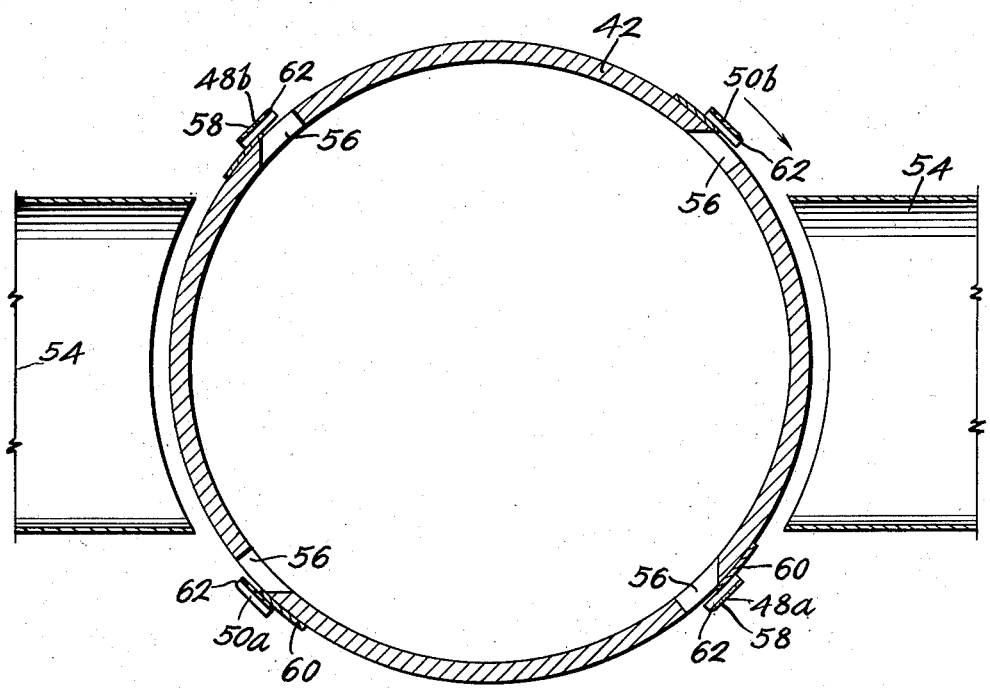
Figure 3 is an enlarged section of the drum and feed chutes taken along line 3—3 of Figure 1.
Figure 4:
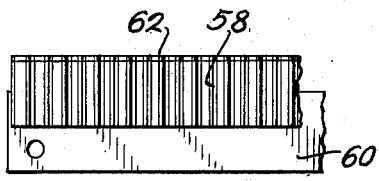
Figure 4 is an enlarged plan view of the cutter.
Figure 5:
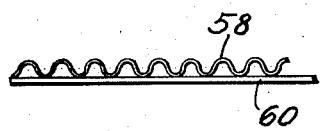
Figure 5 is an edge view of the cutter.

Referring now to Figures 3, 4 and 5, it will be seen that each of the blades is formed to provide a corrugated or scalloped cross section 58 in the conventional manner. The blades are mounted on bed plates 60 which are bolted or otherwise attached to the outer surface of the drum. The sharpened leading edge 62 of the blades projects beyond the bed plates and across the openings 56 in the drum. The first pass of a blade across the exposed face of a vegetable within the inner end of one of the feed chutes will cut a wavy or ribbed surface therein. The next blade moving against the once-cut surface will form a second ribbed face across the first in such a manner that the intersecting grooves between the ribs or lands will be cut away to leave openings in the resulting slice. This, of course, provides the familiar waffle chip or slice that has been known for many years. It is to be noted in this connection that each time a blade passes over a chute with a vegetable therein, a complete waffle chip or slice is produced and it is not necessary to stop the reciprocatory movement of the drum while the slice is being cut. In the construction shown, the four-blade machine will produce four slices or chips during each complete revolution of the drum. In general, one slice is produced for each blade per revolution assuming a number of feed chutes corresponding to the number of blades in each set of cutters.

In the Figures 1 through 5 construction, the drum is mounted on a vertical axis of rotation and the chips fall freely through the open lower end of the drum into any convenient receptacle (not shown) including a vessel filled with hot fat in which they can be cooked.

Figure 7:
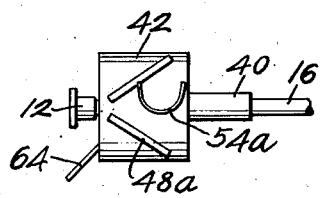
Figure 7 is a small diagrammatic view illustrating the manner in which the machine may be used in horizontal, rather than vertical, position.

In Figure 7, however, a slightly different construction has been illustrated in which the drum is mounted for rotation and reciprocation about a horizontal axis. The feed chute 54a may be open at the top on the side in which the blades are moving downwardly relative to the vegetable. A discharge chute 64 may be used to convey the several chips from the drum.

From the foregoing description of the many useful and novel features of the vegetable slicing machine of the present invention it will be seen that the several useful objects for which it was designed have been achieved. Although the machine has been described in connection with only two basic forms thereof illustrated in the accompanying drawing, I realize that certain modifications may be made therein by those skilled in the art within the intended scope of this disclosure; hence, it is my intention that the scope of protection afforded hereby shall be limited only insofar as said limitations are expressly set forth in the appended claims.

What is claimed is:

1. In a vegetable slicing machine, drive means, a drive shaft operatively connected to the drive means for rotational movement, a drum mounted co-axially on the drive shaft for conjoint rotation therewith, means operatively interconnecting the drive means and drum to effect continuous reciprocatory movement thereof relative to the drive shaft as said drum rotates therewith, at least one feed chute positioned to deliver a vegetable placed herein against the surface of the drum in all reciprocatory positions thereof, two sets of cutters mounted on the surface of the drum in oppositely inclined relation and in position to pass over the delivery end of the feed chute as the drum rotates and reciprocates, one set of cutters being inclined to slice a vegetable in the chute upon reciprocatory movement of the drum in one direction and the other of said sets of cutters being inclined to slice the vegetable upon reciprocatory movement of the drum in the other direction, each of said cutter sets containing at least one blade and both cutter sets having the same number of blades, each of the blades in both cutter sets being formed with a corrugated cross section, the blades of one set of cutters being equiangularly spaced around the circumference of the drum with the blades of the other set equiangularly spaced in alternating relation therebetween, each blade in both sets of cutters forming means for cutting off a slice from a vegetable in the chute and placing a ribbed surface thereon each time said blade passes said chute.

2. A device in accordance with claim 1 in which the number of feed chutes corresponds to the number of blades in each cutter set, the feed chutes being equiangularly spaced around the drum.

3. A device in accordance with claim 1 in which the drum is provided with a plurality of openings ahead of each blade to receive the slices as they are cut off and pass said slices into the interior of the drum.

4. A device in accordance with claim 1 in which each set of cutters contains two blades arranged in angularly spaced parallel relation, the cutting edge of said blades being positioned at right angles to the direction of movement of said blade as it crosses the delivery end of the chute.

5. A device in accordance with claim 1 in which the means for effecting reciprocatory movement of the drum comprises: a crank arm mounted on the drive shaft for rotation in a plane parallel to the axis of rotation of said drive shaft, a connecting rod interconnecting the crank arm and drum, and means operatively interconnecting the drive means and crank arm to effect rotation thereof.

6. A device in accordance with claim 5 in which the means operatively interconnecting the drive means and crank arm comprises: a stationary gear mounted co-axially with the drive shaft, said drive shaft rotating therein, an arm fixed to the drive shaft for rotation therewith, a stub shaft carried for rotation in the arm with the axis of rotation thereof lying in spaced parallel relation to the axis of rotation of said drive shaft, a spur gear mounted on one end of the stub shaft in position to mesh with the stationary gear, a first bevel gear attached to the other end of the stub shaft, a second stub shaft mounted for rotation in the drive shaft with the axis of rotation thereof perpendicular to and intersecting the axis of rotation of said drive shaft, and a second bevel gear mounted on one end of the second stub shaft in position to mesh with the first bevel gear, the crank arm being attached to the other end of the second stub shaft.

7. A device in accordance with claim 6 in which each set of cutters contains two blades, the gear ratio between the stationary gear and spur gear is 2:1, and the gear ratio between the first and second bevel gears is 1:1 whereupon the drum will move through two complete reciprocatory cycles for each 360° turn thereof.

8. A vegetable slicing machine comprising: drive means; a drive shaft operatively connected to the drive means for rotational movement; a drum mounted co-axially on the drive shaft for conjoint rotation therewith and reciprocatory movement relative thereto; a stationary gear mounted co-axially with the drive shaft, said drive shaft rotating therein; an arm fixed to the drive shaft for rotation therewith; a stub shaft carried for rotation by the arm with the axis of rotation thereof lying in spaced parallel relation to the axis of rotation of said drive shaft; a spur gear fixed to one end of the stub shaft in position to mesh with the stationary gear; a first bevel gear fixed to the other end of the stub shaft; a second stub shaft mounted for rotation in the drive shaft with the axis thereof perpendicular to and intersecting the axis of rotation of said drive shaft; a second bevel gear fixed to one end of the second stub shaft in position to mesh with the first bevel gear; a crank arm fixed to the other end of the second stub shaft for rotational movement in a plane substantially parallel to the axis of rotation of the drive shaft; a connecting rod interconnecting the crank arm and drum to effect continuous reciprocatory movement thereof while the drive shaft is rotating; at least one feed chute positioned to deliver a vegetable placed therein against the surface of the drum in all reciprocatory positions thereof; two sets of cutters mounted on the surface of the drum in oppositely inclined relation and in position to pass over the delivery end of the feed chute as the drum rotates and reciprocates, one set of cutters being inclined to slice a vegetable in the chute upon reciprocatory movement of the drum in one direction and the other of said sets of cutters being inclined to slice the vegetable upon reciprocatory movement of the drum in the other direction; and, each of said cutter sets containing at least one blade and both cutter sets having the same number of blades, each of the blades in both cutter sets being formed with a corrugated cross section, the blades of one set of cutters being equiangularly spaced around the circumference of the drum with the blades of the other set equiangularly spaced in alternating relation therebetween, each blade in both sets of cutters forming means for cutting off a slice from a vegetable in the chute and placing a ribbed surface thereon each time said blade passes said chute.

9. A device in accordance with claim 8 in which each set of cutters contains two blades, the gear ratio between the stationary gear and spur gear is 2:1, and the gear ratio between the first and second bevel gears is 1:1 whereupon, the drum will move through two complete reciprocatory cycles for each 360° turn thereof.

References Cited in the file of this patent

FOREIGN PATENTS

| 104,780 | Austria | Nov. 25, 1926 |
| 384,419 | Great Britain | Dec. 8, 1932 |